(12) United States Patent
Swineford et al.

(10) Patent No.: US 9,166,954 B2
(45) Date of Patent: Oct. 20, 2015

(54) DOCUMENT-AUTHORIZED ACCESS TO A SHARED WORKSPACE

(75) Inventors: Randy L. Swineford, San Jose, CA (US); Barnaby James, San Jose, CA (US); Patrick R. Wibbeler, Rocklin, CA (US)

(73) Assignee: Adobe Systems Incorporated, San Jose, CA (US)

(*) Notice: Subject to any disclaimer, the term of this patent is extended or adjusted under 35 U.S.C. 154(b) by 1895 days.

(21) Appl. No.: 12/040,114

(22) Filed: Feb. 29, 2008

(65) Prior Publication Data

US 2014/0029751 A1    Jan. 30, 2014

(51) Int. Cl.
*H04L 29/06* (2006.01)
*G06F 21/60* (2013.01)

(52) U.S. Cl.
CPC .......... *H04L 63/0428* (2013.01); *G06F 21/606* (2013.01); *H04L 63/083* (2013.01); *H04L 63/10* (2013.01); *G06F 2221/2149* (2013.01)

(58) Field of Classification Search
CPC ....... G06F 21/30–21/31; G06F 21/33–21/335; G06F 21/44–21/445; G06F 21/62–21/6281; G06F 21/60–21/606; H04L 9/08–9/0805; H04L 9/0816–9/0836; H04L 63/06–63/068; H04L 63/08–63/0846; H04L 29/06707–29/06748; H04L 29/06755–29/06795; H04L 63/0428–63/0492; H04L 63/10–63/108; H04L 67/10–67/1097
USPC .............................................. 380/283; 726/20
See application file for complete search history.

(56) References Cited

U.S. PATENT DOCUMENTS

| | | | |
|---|---|---|---|
| 5,787,175 A * | 7/1998 | Carter ............................ | 713/165 |
| 7,467,415 B2 * | 12/2008 | Carter ............................ | 726/27 |
| 8,196,029 B1 * | 6/2012 | Rucker et al. ................. | 715/200 |
| 2004/0088548 A1 * | 5/2004 | Smetters et al. .............. | 713/175 |
| 2004/0205653 A1 * | 10/2004 | Hadfield et al. ............. | 715/530 |
| 2006/0190742 A1 * | 8/2006 | Ebitani et al. ................ | 713/193 |
| 2009/0327729 A1 * | 12/2009 | Rhodes et al. ................ | 713/171 |

* cited by examiner

*Primary Examiner* — Linglan Edwards
*Assistant Examiner* — Kevin Bechtel
(74) *Attorney, Agent, or Firm* — Shook, Hardy & Bacon, L.L.P.

(57) ABSTRACT

Various embodiments described herein each provide one or more of systems, methods, software, and data structures that facilitate document-authorized access to a shared workspace. Some of these embodiments provide access to a shared workspace, such as a document review comment repository, through data embedded within a document. Mere possession of a document with a key, or other data element, allows a possessor of the document to participate in a workflow process.

23 Claims, 6 Drawing Sheets

DOCUMENT-AUTHORIZED ACCESS TO A SHARED WORKSPACE

BACKGROUND INFORMATION

Networked workflow services require users to identify themselves prior to utilizing shared systems, processes, and workspaces. For users to properly identify themselves, each user needs an account within such a system and have proper permissions. Account creation is typically a laborious process and requires several steps.

DETAILED DESCRIPTION

For simple operations, such as ad hoc document review and workflow process, identity of individuals providing input is less important and existing, laborious account creation processes tend to discourage individuals from participating. In addition, such account creation processes typically require a process initiator to be aware of all users that should participate prior to submitting a document or other data for review or processing by other individuals.

Various embodiments described herein each provide one or more of systems, methods, software, and data structures that facilitate document-authorized access to a shared workspace. Some of these embodiments provide access to a shared workspace, such as a document review comment repository, through data embedded within a document. Mere possession of a document with a key, or other data element, allows a possessor of the document to participate in a workflow process.

A shared workspace, when instantiated, may be used to exchange data related to a document, set of documents, or other data structure that includes the data necessary to connect to a shared workspace. Data exchanged via a shared workspace is generally not limited other than by what a shared workspace administrator may set. In certain embodiments, the shared workspace is used to exchange workflow-related data or information, such as data related to a document review, form data collection, or other processes. In some embodiments, data that may be stored and exchanged via a shared workspace may include data representative of document comments, commands, edits, modifications, formatting changes, additions, deletions, form data, approvals and rejections, attachments of other data elements which may include images, video, audio, text, and other documents and data. However, as noted above, data stored in and exchanged via a shared workspace in some embodiments is not limited. Thus, a shared workspace, in some embodiments, is a data repository, such as a storage location on a server, that is operative to store data in relation to a document.

In one example embodiment, users are able to exchange electronic copies of a document in many ways, such as email, on disk or other portable medium, in a shared folder of a shared drive, downloading from a website, or other means allowing transfer of an electronic copy of the document. Upon receipt of an electronic copy of the document, or other data structure, users are able to interact with a specific workflow through a network service, embodiments of which are described in detail below. In some embodiments, only an initiator of a workflow, such as a document review workflow, needs an account on or with the network service. Other users participating in the designated workflow do not need to authenticate themselves, and thus, do not need user-specific accounts setup to participate in the workflow.

In some embodiments, the workflow initiator establishes, or already has, an account with a network service providing workflow services. Each time the initiator starts a new workflow, such as for a document review, a form fill out, or other process, the service issues an key, such as an encryption or signing key, which is stored in the document. The network service associates the key with a specific instance of a workflow and will not allow any network request to read or write data associated with the workflow unless the request provides the appropriate credentials, such as the key itself or a signing of a network request using the key.

The initiator may then distribute the document via some out of band method (e.g. email the document to specific users). When each user opens the document and participates in the workflow, network operations that interact with the service (e.g. submit a form, get/send comments) automatically include the key embedded in the document to allow interaction with the network service.

In some other embodiments, a network address is embedded within or otherwise assocaited with a document and a symmetric encryption key. The network services have no knowledge of the symmetric encryption key, but do have knowledge of the network address that identifies a shared workspace of the document. Possessors of the document, in such embodiments, use the symmetric encryption key to encrypt data sent to and retrieved from the shared workspace identified by the network address embedded in the document. As a result, a repository of a shared workspace may be hosted by an application service provider or the repository may be located on virtually any server and the content of the repository will remain confidential to possessors of the document who possess the symmetric encryption key.

These and other embodiments are described in detail below and illustrated in the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
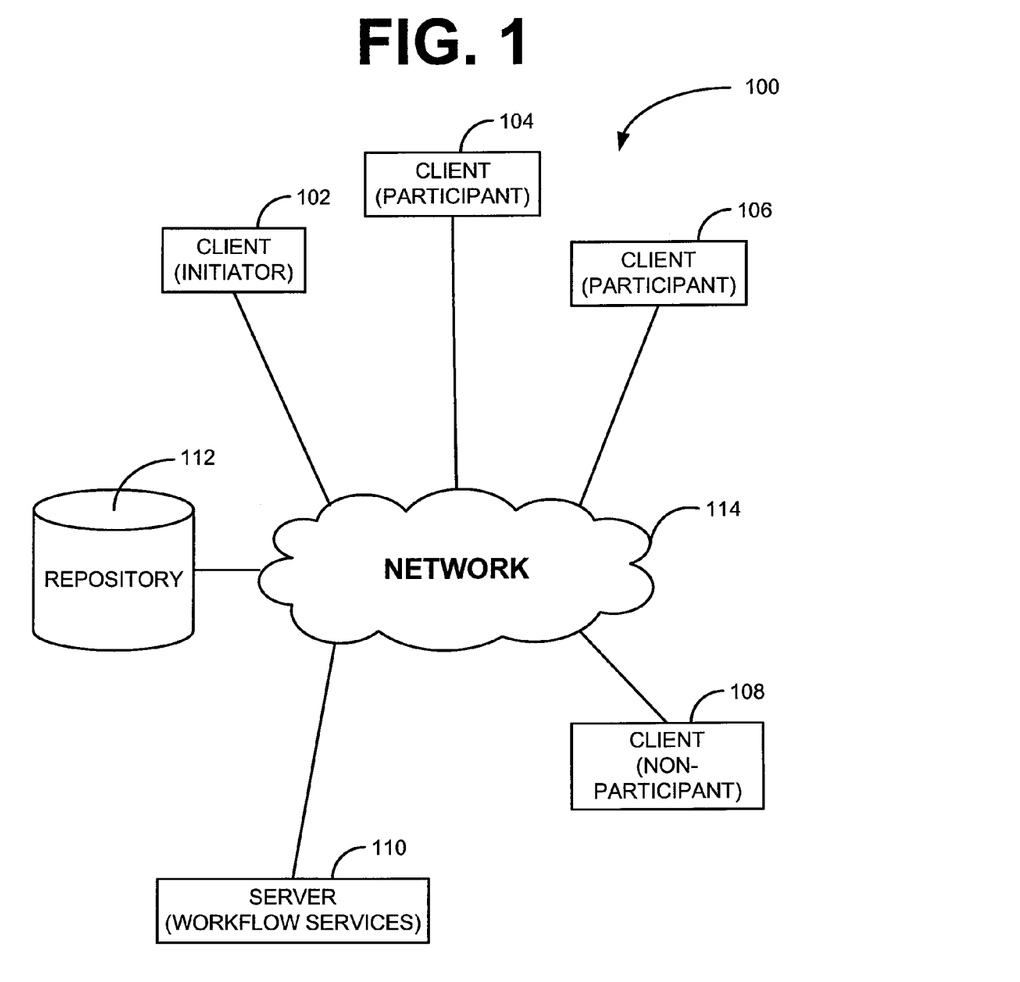
FIG. 1 is a block diagram of a system according to an example embodiment.

FIG. 1 is a block diagram of a system 100 according to an example embodiment. The system includes clients 102, 104, 106, and 108 connected to a network 114 that is also connected to a server 110 offering workflow services. In some embodiments, a workflow repository 112 is also connected to the network. The client 102 in some embodiments may be an initiator of a workflow process, such as a document review, a data collection process through an electronic form, or other process. The client 102 in such embodiments establishes, or already has established, an account to utilize the workflow services of the server 110.

In an example document review workflow, the client 102 initiator creates or otherwise possesses a document that is to be the subject of a document review workflow process. The client 102 initiator submits a request to instantiate a new workflow process over the network 114 to the workflow services of the server 110. The workflow services on the server 110 process that request and, assuming the workflow services verify the identity and permission of the client 102 initiator to initiate a workflow process, returns a workflow process key over the network to the client 102 initiator. In some embodiments, the workflow services on the server 110 establish a record of the initiated workflow process in a data store, such as in a database on the server 110 or within the workflow repository 112. The record of the initiated workflow may be indexed by the generated key to allow identification of the appropriate workflow repository to store and retrieve workflow data as a function of the key. The key, in some embodiments, is a symmetric encryption key that may be utilized to encrypt data sent to and decrypt data received from the workflow services on the server 110. The workflow services may also establish a location where workflow data is stored when received, also referred to as a shared workspace. Such workflow data that may be stored in a shared workspace may include data representative of document comments, commands, edits, modifications, formatting changes, additions, deletions, form data, approvals and rejections, attachments of other data elements which may include images, video, audio, text, and other documents and data. The location of where the workflow data is to be stored in such embodiments is stored by the workflow service in association to the record and key of the initiated workflow process.

The client 102 initiator, upon receipt of the key from the server 110, associates of the key with the document by inserting up the key, or a representation thereof, into the document to be reviewed. The key may be stored in a metadata portion of the document, or another location where the key will not otherwise affect a graphical presentation of the document when displayed to a user. In some embodiments, a Uniform Resource Identifier ("URI"), such as a Uniform Resource Locator ("URL"), of the server 110 and workflow services operative thereon or the workflow repository 112, is also embedded in the document to allow participants to properly address workflow process submissions and data retrieval requests.

At this point, the document of the document review workflow process may then be distributed, in electronic form, to workflow process participants, such as clients 104 and 106. The document may be distributed in any number of ways such as email, through a shared folder on a networked server, on a portable computer-readable medium such as a disk or memory stick, or other means capable of carrying the document in electronic form to other client computing devices.

The clients 104, 106 open the document using an appropriate workflow-enabled application. The application extracts the key embedded in the document, and the URI of the server 110 or the workflow repository 112 if embedded therein and not already known, such as may be known through an application configuration setting. In some embodiments, the application may submit a request over the network 114 to the workflow services of the server 110 to retrieve content submitted by other participants of the workflow process, such as document review comments. The request, in some embodiments, includes the key extracted from the document. In other embodiments, the request is signed and/or encrypted using the key. The workflow services on the server 110 upon receipt of the request may simply retrieve the requested workflow content and send it over the network to the requesting client. However, in some embodiments, the client 102 initiator may have restricted access to submitted content. In such embodiments, a limited set of the stored workflow content or no workflow content is sent to the requestor.

The participant clients 104, 106 may then receive input into the document, such as comments, document edits, data signifying an acceptance or rejection of the document, or other input. The participant clients 104, 106 may then upload the input to the workflow services of the server 110, or in some embodiments, directly to the repository 112. The uploaded data may include the key or be encrypted and/or signed using the key. The data may be uploaded by the client 104, 106 applications upon the occurrence of an event, such as saving of the document, selection of a menu item or action button, or other event configured in the application to trigger an upload of the received input.

The workflow services of the server 110, upon receipt of the client 104, 106 input, parses the received input to extract, or otherwise determine, the key associated with the received input. The key is then used to identify the workflow process to which the received input belongs. The input is then stored in the identified workflow repository.

Client 108 is identified in FIG. 1 as a non-participant. Client 108 is not a participant due to the fact that client 108 did not receive an electronic copy of the document including the key or does not have an application installed enabled to allow the client 108 to participate in the workflow process. Assuming a client has an appropriate, workflow enabled application installed, mere possession of the document allows the client to participate in the workflow process. This removes the need to establish user accounts and permissions for each user that may be needed or chooses to participate in a particular workflow. As a result, ad-hoc workflows may be established with little effort.

Figure 2:
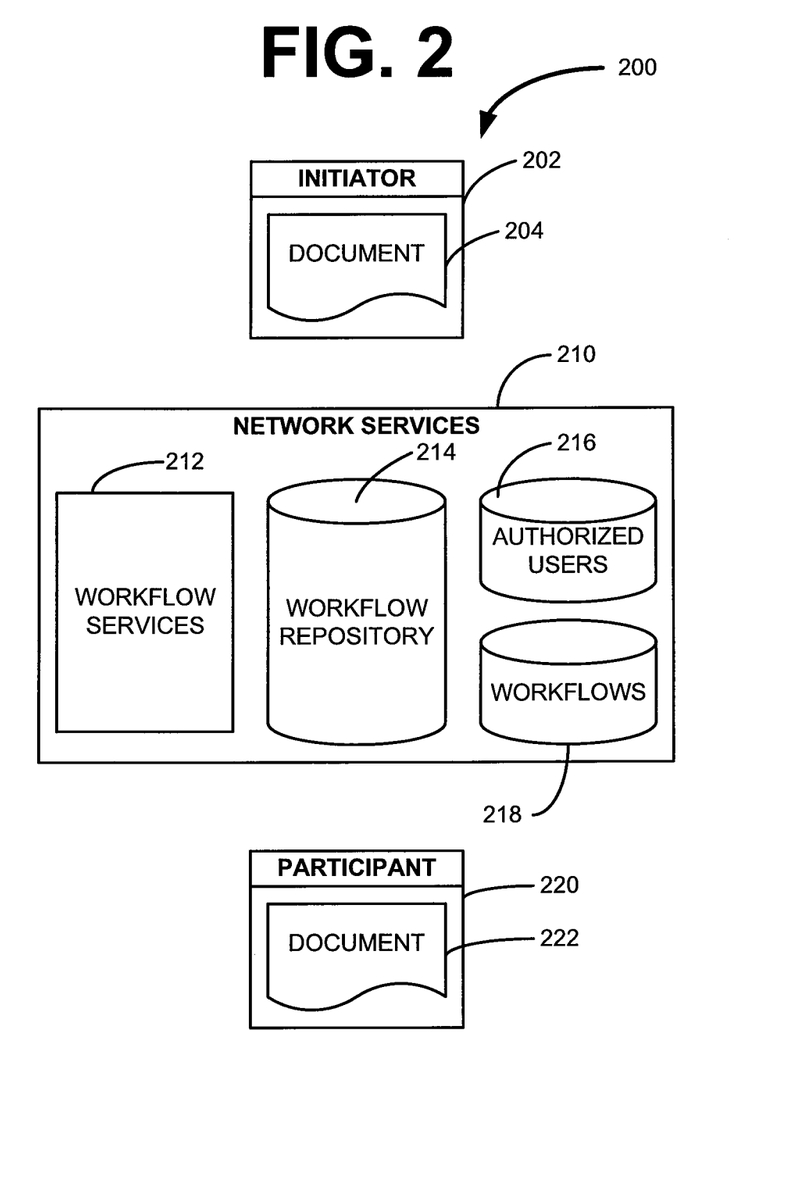
FIG. 2 is a block diagram of system elements according to an example embodiment.

FIG. 2 is a block diagram of system 200 elements according to an example embodiment. The system 200 includes an initiator application 202, a network services 210, and a participant application 220. In some embodiments, the initiator application 202 and the participant application 220 are instances of the same application. The network services 210 may be services offered on one or more servers and are illustrated as a logical grouping of services and data stores. In some embodiments, the elements illustrated as network services 210 may be physically located apart from one another in a networked computing environment.

The initiator application 202 is an application from which a document 204, or other data structure, may be setup for a workflow process utilizing the network services. In some embodiments, the initiator application 202 may also be an application providing tools that may be used to author, modify, and view documents, such as word processing documents, images, spreadsheets, videos, audio files, forms, and other document types. Once the document 204 is determined by a user to be in a state that is ready for a workflow process, such as a document review or to receive form submissions, the initiator application 202 provides tools, such as menu items and/or action buttons that may be used to setup a workflow process. Use of such tools causes the initiator application 202 to establish communication with the network services 210, such as the workflow services 212. Through communication with the network services, the initiator application receives a workflow key to embed in the document 204 and may also receive a URI of the network services, which may be used to access the workflow services in combination with the key to establish future communication with the network services, such as by workflow participants.

The network services 210 include workflow services 212, a workflow repository 214, an authorized users database 216, and a workflow database 218. The workflow services 212 include services, which may be accessed by workflow initiators to establish workflows and to retrieve workflow data stored in the workflow repository 214. The workflow services 212 also include services, which may be used by workflow participants to post data to, and optionally retrieve data from the workflow repository 214. In some embodiments, data stored in the workflow repository 214 for a designated workflow includes data representative of modifications and/or comments added to a document that is the subject of the designated workflow. An instance of the document that is the subject of the designated workflow need not be stored in the workflow repository.

An example workflow service 212 that allows an initiator to establish a workflow receives identify data, such as a user ID and password, from an initiator and queries the authorized users database 216 to verify the initiator is authorized to establish a workflow. If the initiator is authorized, the same workflow service may be used, or another workflow service may be called, to establish the workflow. Such as workflow service 212 will cause a key to be generated for the new workflow, such as through use of a Trusted Platform Module or other mechanism by which a key may be created, and that key, or a representation thereof, is inserted into a new record in the workflows database 218. In some embodiments, the new workflow record also contains a reference to a location in a workflow repository, such as a folder when the workflow repository 214 is a file server, or a database key for the workflow when the workflow repository is a database. As a result, the workflows database 218 may be queried by the key to retrieve a location of the workflow repository to determine where to store and retrieve data associated with a particular workflow.

In some embodiments, an initiator of a workflow may disable a workflow though modification of data in the workflows database 218 though the initiator application. For example, a workflows database 218 record may include a column with a Boolean value designating the corresponding workflow as enabled or disabled. If the value is disabled, no further data may be stored in the workflow repository for that workflow, but the initiator, or other, may still retrieve such data. In other embodiments, the key may removed from the record, which removes the ability of workflow participants from uniquely identifying the proper workflow to which workflow data is to be posted to.

The participant application 220, as stated above, may be an instance of the same application as the initiator application 202. However, the participant application 220 need not include all of the functionality of the initiator application 202 and the initiator application 202 need not include all of the functionality of the participant application 220. In some embodiments, the participant application 220 is operative to open a document 222 and extract a workflow key therefrom. The document 222 may be an electronic instance of the document 204 designated for a workflow process within the initiator application 202. Once in possession of the extracted key, the participant application may simply wait until occurrence of an action that triggers an upload process to the network services. Such an action may be a save action, selection of an action button or menu item within a user interface of the participant application, or other action identifiable by the participant application.

Upon occurrence of such an action, the participant application 220, in some embodiments, extracts a representation of modifications to the document, such as document changes, added form data, new comments, and the like, and sends the representation to the network services. In some embodiments, the representation sent to the network services includes the key, which is used by the network services to index into the workflows database 218 to identify the specific workflow for which the data is applicable. In other embodiments, the representation of document changes is signed using the key and sent to the network services 210. The workflow services 212, in such embodiments, include a service to parse the signing and attribute the data to a workflow key stored in the workflows database 218.

Figure 3:
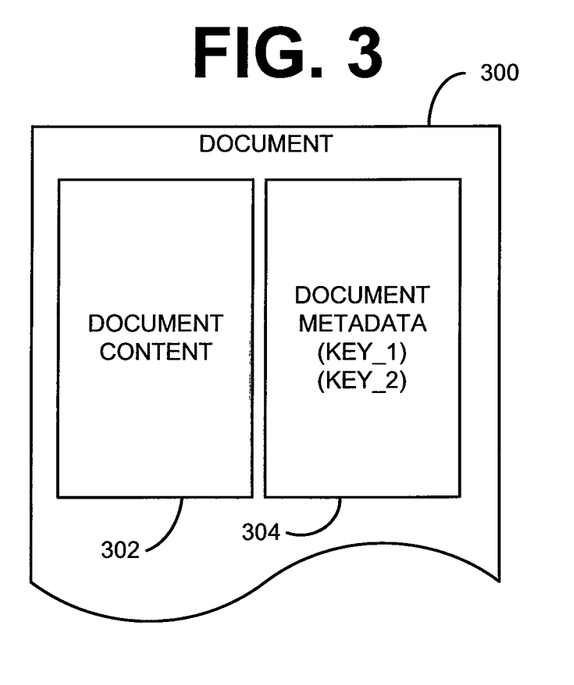
FIG. 3 is a block diagram of a data structure according to an example embodiment.

FIG. 3 is a block diagram of a data structure 300 according to an example embodiment. The data structure 300 is a container for document data. As used herein, the term "document" is used interchangeably with the term "file," unless expressly stated otherwise or as is readily apparent from the meaning of the language herein. Thus, "document," is intended to represent an electronic file that may be a document, such as an electronic document authored using a word processing application, or other electronic file type, such as a spreadsheet, a file encoded according page description language format specification, an image file, an audio file, a video file, which may be opened for viewing, editing, and/or commenting.

The document 300 of FIG. 3 includes document content 302 and document metadata 304. The document content 302 is content that may be displayed or otherwise affects the display of the document 300 in a user interface or when printed. Such document content 302, in the context of a word processing document, includes text of the document and may also include formatting data. The document metadata often includes data identifying a date and time of when the document 300 was created, last saved, file size, and other data that is typically not viewable with the document content 302. The actual makeup of the document metadata depends on the type of document and application used to author and modify the document content 302. However, the document metadata 304, in the workflow embodiments described herein, includes at least one key. The key may be an encryption key, or other identifier, associating the document 300 to a workflow process. In some embodiments, the document may include a second key that is used to encrypt workflow data sent to a workflow server, as described above. The second key is typically not known to the workflow server and workflow data stored on the server remains confidential. Only participants in possession of an instance of the document 300 have the second key. This allows for an application service provider type model of workflow server hosting. Such workflow servers may be maintained by a third party, but the third party will not be able to find meaning in the data in a workflow repository.

Figure 4:
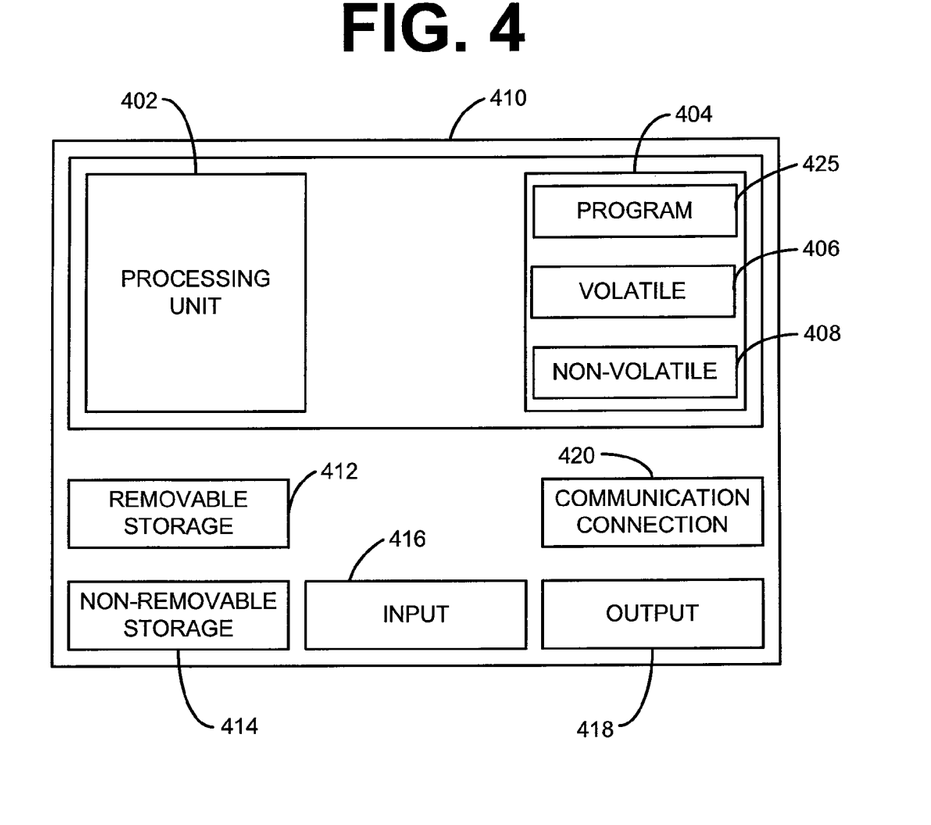
FIG. 4 is a block diagram of a system according to an example embodiment.

FIG. 4 is a block diagram of a system according to an example embodiment. In one embodiment, multiple such computer systems are utilized in a distributed network to implement multiple components in a transaction-based environment. An object oriented or service oriented architecture may be used to implement such functions and communicate between the multiple systems and components. One example computing device in the form of a computer 410, may include a processing unit 402, memory 404, removable storage 412, and non-removable storage 414. Memory 404 may include volatile memory 406 and non-volatile memory 408. Computer 410 may include—or have access to a computing environment that includes—a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 402 of the computer 410. A hard drive, CD-ROM, and RAM are some examples of articles including a computer-readable medium. For example, a computer program 425 capable of performing various data processing functions.

For example, in some embodiments, the computer 410 may implemented as a server, such as server 110 illustrated and described with regard to FIG. 1 and including a computer program 425 implementing one or more of the network services 210 illustrated and described with regard to FIG. 2. In some embodiments, the computer 410 may also be implemented as client, such as clients 102, 104, and 106 illustrated and described with regard to FIG. 1 and including a computer program 425 implementing one or both of the initiator application 202 and participant application 220 as illustrated and described with regard to FIG. 2.

Figure 5:
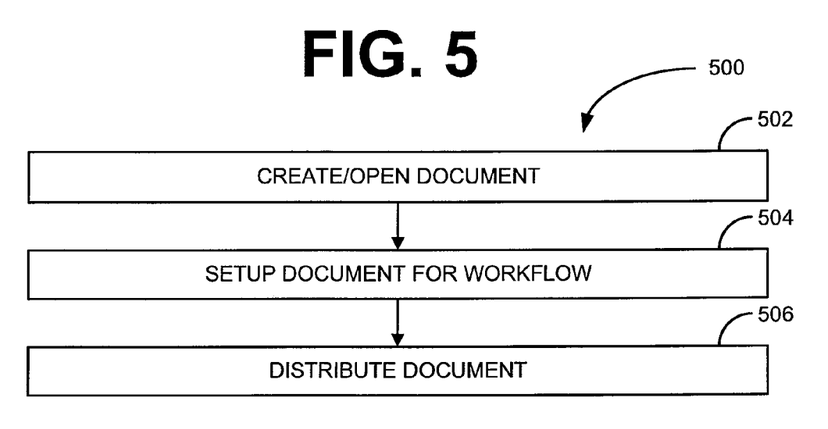
FIG. 5 is a block flow diagram of a method according to an example embodiment.

FIG. 5 is a block flow diagram of a method 500 according to an example embodiment. The method 500 is an example of a method that may be performed on a computing device of a workflow initiator. The method 500 includes creating 502 a document, or opening and existing document, setting up 504 the document for a workflow, and distributing the document 506.

In some embodiments, setting up 504 the document for a workflow includes requesting, over a network, that a shared workspace be instantiated on a server and, in response, receiving a key to an instantiated shared workspace. The method 500 then inserts the key into a document and saves the document, such as to a hard disk or other machine-readable medium either local or remote to a computing device performing the method. Some further embodiments include inserting a second key into the document that will be used to encrypt workflow data sent to and stored in a workflow repository.

Figure 6:
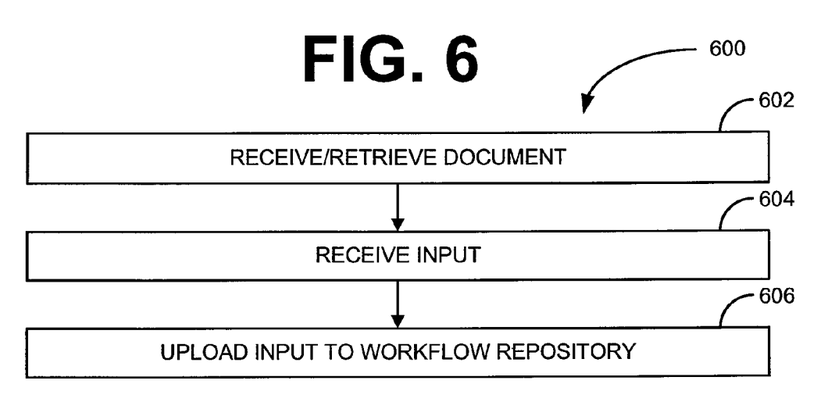
FIG. 6 is a block flow diagram of a method according to an example embodiment.

FIG. 6 is a block flow diagram of a method 600 according to an example embodiment. The method 600 is an example method that may be performed one a computing device of a workflow participant. The method 600 includes receiving 602, or otherwise retrieving a document, including data needed to associate the document with a workflow process instantiated on a workflow server. The method 600 further includes receiving 604 input to the document, such as comments, form data, and document modifications and additions. The method 600 then uploads 606 the input to the workflow repository associated with the instantiated workflow process.

In some embodiments, receiving 602 the document includes opening the document and extracting a key embedded therein. The extracted key is later used, when uploading 606 input to the workflow repository to generate a workflow data package. A workflow data package may include a representation of the received input and a copy of the extracted key. In some embodiments, the workflow data package is signed using the key. In some embodiment, the representation of the received input is encrypted in the workflow data package using a second key embedded in and extracted from the received 602 document. Thus, in some embodiments, the received 604 input may be encrypted in a workflow data package as a function of one key not known to the workflow server and the workflow data package may be signed as a function of another key known to the workflow server.

In some embodiments, the method 600 also includes storing the received 604 input with a local instance of the document. Further embodiments also include retrieving workflow data from a workflow repository as a function of a key extracted form the document and storing the retrieved workflow data with the local instance of the document.

Figure 7:
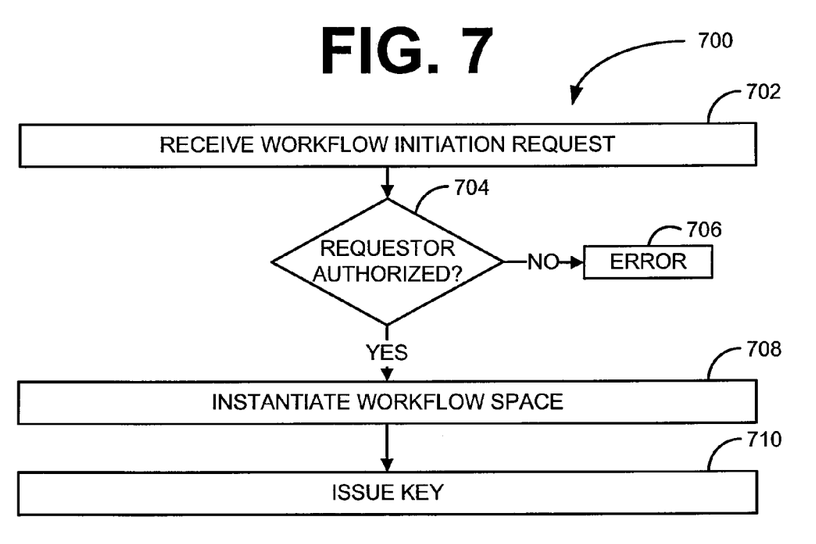
FIG. 7 is a block flow diagram of a method according to an example embodiment.

FIG. 7 is a block flow diagram of a method 700 according to an example embodiment. The method 700 is an example method that may be performed by a workflow server when instantiating a workflow. The method 700 includes receiving 702 a workflow initiation request and verifying 704 the requestor is authorized. Such verification may include requesting, receiving, and verifying a user ID and password of a requestor in view of a permissions database. If the requestor is not authorized, the method 700 returns 706 an error. However, if the requestor is authorized, the method 700 includes instantiating 708 a shared workspace and issuing 710 a key to the requestor that is associated with the instantiated 708 shared workspace.

Another embodiment provides a system including a server coupled to a network. The server in one embodiment is operable receive, over the network, a shared workspace instantiation request from an initiator and verify the initiator is authorized to request instantiation of a shared workspace. Upon verified authorization of the initiator, the server is further operable to generate a shared workspace and a key associated to the shared workspace and then store the key in association to the shared workspace in a key-workspace data structure, such as a database. The server may then send the key to the initiator over the network.

In generating a shared workspace, the server may be operable to create a folder in a data storage location, such as a file server, accessible over the network to hold shared workspace data. In some embodiments, the server is further operable to receive a request, including a representation of the key, to post data to the shared workspace and then identify the shared workspace to post the data to as a function of the key representation and the key-workspace data structure. The data may then be stored in the identified shared workspace.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A computerized method comprising:
   requesting, by a client initiator to a computer server over a computer network, a shared workspace be instantiated on the computer server for a local instance of an electronic document, the shared workspace being a data repository apart from the electronic document configured to store workflow data comprising data representative of one or more modifications, comments, or combinations thereof to the electronic document;
   receiving, by the client initiator from the computer server over the computer network in response to the request, an encryption key to an instantiated shared workspace on the computer server and a Uniform Resource Identifier of a computer network location of the shared workspace, wherein the instantiated shared workspace is indexed by the encryption key in the computer server;
   inserting the encryption key and the Uniform Resource Identifier into a metadata or other portion of the electronic document that will not affect a graphical presentation of the electronic document when displayed to a user, the encryption key being an identifier of the electronic document to the shared workspace and being a sole credential for accessing workflow data stored in the shared workspace at the computer network location of the Uniform Resource Identifier, wherein any user in possession of the electronic document including the encryption key authorizes the user access to the workflow data stored in the shared workspace including enabling the user to post data to the shared workspace representative of modifications and/or comments to the electronic document; and
   saving the electronic document.

2. The computerized method of claim 1, wherein, after receiving the encryption key, the computerized method further includes:
   signing communications to be sent over the computer network to the shared workspace on the computer server as a function of the encryption key.

3. The computerized method of claim 1, further comprising: distributing the electronic document.

4. The computerized method of claim 3, wherein the distributing of the electronic document includes emailing the electronic document.

5. The computerized method of claim 1, further comprising:
   inserting a further key into the electronic document, the further key being unknown to the shared workspace and used for encryption and decryption of workflow data by participants in possession of the electronic document having the further key;
   encrypting the workflow data to be sent to the shared workspace as a function of the further key; and
   signing a communication to be sent over the computer network as a function of the encryption key of the instantiated shared workspace on the computer server.

6. The computerized method of claim 5, further comprising:
   requesting from the shared workspace, all workflow data related to the electronic document stored thereon, the request signed as a function of the encryption key of the instantiated workspace on the computer server;
   receiving a communication including the requested workflow data over the computer network;
   verifying the communication is signed as a function of the encryption key of the instantiated shared workspace; and
   decrypting as a function of the further key.

7. A computerized method comprising:
   accessing a local instance of an electronic document stored in a computer memory;
   retrieving, from a metadata or other portion of the electronic document that will not affect a graphical presentation of the electronic document when displayed to a user, data comprising a Uniform Resource Identifier identifying a computer network location of a workflow repository on a computer server and a first encryption key, the first encryption key being an identifier of the electronic document to the workflow repository and a sole credential for transmitting workflow information to and from the identified workflow repository, the workflow repository being a data repository apart from the electronic document configured to store workflow information comprising data representative of modifications, comments, or combinations thereof to the electronic document, wherein any user in possession of the electronic document including the encryption key authorizes the user access to the workflow information;
   receiving input from a user, the input representative of modifications and/or comments to the electronic document;
   processing the input as a function of the first encryption key to generate workflow information; and uploading the workflow information to the workflow repository identified in the electronic document and indexed by the first encryption key in the server.

8. The computerized method of claim 7, wherein the processing of the input includes signing the workflow information as a function of the first encryption key.

9. The computerized method of claim 7, wherein the processing of the input includes encrypting the workflow information as a function of the first encryption key.

10. The computerized method of claim 7, further comprising:
retrieving a second key from the electronic document; and
wherein the processing of the input further includes processing the input as a function of the second key.

11. The computerized method of claim 10, wherein the processing of the input includes:
encrypting the input as a function of the second key; and
signing the workflow information as a function of the first encryption key.

12. The computerized method of claim 7, wherein the electronic document is encoded according to a page description language file format specification.

13. The computerized method of claim 7, further comprising:
retrieving workflow data from the workflow repository; and adding the retrieved workflow data to the electronic document.

14. The computerized method of claim 13, further comprising:
decrypting the retrieved workflow data as a function of the first encryption key.

15. The computerized method of claim 7, further comprising:
storing the input in an electronic file of the electronic document.

16. A computerized method comprising:
receiving a workflow initiation request on a computer server from a client initiator over a computer network for an electronic document local to the client initiator;
verify the client initiator is identified as an authorized user in a permission database;
instantiating a workflow repository on the computer server, the workflow repository configured to store workflow data comprising data representative of modifications, comments, or combinations thereof;
issuing a Uniform Resource Identifier and a symmetric encryption key from the computer server to the client initiator over the computer network upon successful verification in the permission database, the Uniform Resource Identifier and symmetric encryption key to be inserted, into a metadata or other portion of the electronic document that will not affect a graphical presentation of the electronic document when displayed to a user, by the client initiator, wherein the symmetric encryption key is a sole credential used to verify an association with the instantiated workflow repository and provide access thereto, to users in possession of the electronic document including the symmetric encryption key;
maintaining an electronic record of the symmetric encryption key associated with the workflow repository for indexing; and
storing received workflow data representative of modifications and/or comments to the electronic document in the workflow repository responsive to the received workflow data being signed as a function of the symmetric encryption key.

17. The computerized method of claim 16, wherein the storing of the received workflow data in the workflow repository includes:
encrypting the workflow data as function of the symmetric encryption key.

18. A system comprising:
a computer network; and
a computer server coupled to the computer network, the computer server comprising instructions stored thereon that, when executed by the computer server, cause the computer server to:
receive, over the computer network, a shared workspace instantiation request from a client initiator for an electronic document local to the client initiator;
verify the client initiator is authorized to request instantiation of a shared workspace;
upon verified authorization of the client initiator, generating a shared workspace, a Uniform Resource Identifier, and an encryption key associated to the shared workspace, the shared workspace being a data repository apart from the electronic document configured to store workflow data comprising data representative of modifications, comments, or combinations thereof to the electronic document;
store the encryption key in association to the shared workspace in a key-workspace data structure for indexing the shared workspace; and
send, over the computer network, the Uniform Resource Identifier and the encryption key to the client initiator, the Uniform Resource Identifier and the encryption key to be inserted, into a metadata or other portion of the electronic document that will not affect a graphical presentation of the electronic document when displayed to a user, by the client initiator as a sole credential used to verify association with the generated shared workspace and provide access thereto, to users in possession of the electronic document including the encryption key.

19. The system of claim 18, wherein the computer server, in generating a shared workspace, is configured to:
create a folder in a data storage location accessible over the computer network to hold shared workspace data.

20. The system of claim 18, wherein the computer server is further configured to:
receive, over the computer network, a request to post data to the shared workspace, the request including a representation of the encryption key;
identify the shared workspace to post the data to as a function of the encryption key representation and the key-workspace data structure; and
store the data in the shared workspace.

21. The system of claim 20, wherein the computer server, in generating a shared workspace, is configured to:
receive, from a requestor and over the computer network, a shared workspace data retrieve request including a representation of the encryption key;
identify the shared workspace for which the retrieve request is for as a function of the encryption key representation and the key-workspace data structure, the key-workspace data structure being an index of shared workspaces identifiable by their key representations;
retrieve the data from the identified shared workspace; and
send, over the computer network, the shared workspace data to the requestor.

22. The system of claim 20, wherein the representation of the encryption key is a signing of the request to post data as a function of the encryption key.

23. The system of claim 18, wherein the encryption key is a symmetric encryption key.

* * * * *